United States Patent [19]

Köchler et al.

[11] Patent Number: 5,070,517

[45] Date of Patent: Dec. 3, 1991

[54] METHOD AND CIRCUIT FOR RETUNING THE FREQUENCY OF A FREQUENCY SOURCE

[75] Inventors: Helmut Köchler; Günter Nestler, both of Samstagern, Switzerland

[73] Assignee: Erika Kochler, Samstagern, Switzerland

[21] Appl. No.: 272,721

[22] Filed: Nov. 17, 1988

[30] Foreign Application Priority Data

Nov. 23, 1987 [CH] Switzerland ................ 4552/87

[51] Int. Cl.$^5$ .............................................. H04L 25/38
[52] U.S. Cl. .................................. 375/117; 377/107; 328/73
[58] Field of Search ............... 375/111, 117, 119, 120, 375/23, 107, 113; 455/51, 70, 77, 71, 69; 331/18, 47; 377/107, 109, 110; 370/48, 95.1, 110.1; 379/59-60; 340/825.04, 825.2; 178/69 R, 69 A; 328/73

[56] References Cited

U.S. PATENT DOCUMENTS

| 3,247,491 | 4/1966 | Du Vall | 375/111 |
| 3,388,216 | 6/1968 | Brooke et al. | 375/117 |
| 4,196,416 | 4/1980 | Stein | 375/111 |
| 4,651,103 | 3/1987 | Grimes | 328/72 |
| 4,811,365 | 3/1989 | Manno | 375/107 |

OTHER PUBLICATIONS

International Conference on Communications, Jun. 14-16, 1976, Dr. H. A. Stover: "Timing and Synchronization of Switched Digital Communications Networks", pp. 25-1 to 25-6.

Primary Examiner—Douglas W. Olms
Assistant Examiner—Tesfaldet Bocure
Attorney, Agent, or Firm—Ladas & Parry

[57] ABSTRACT

In order to adjust the frequency of an oscillator in a substation of a network to a reference frequency of the network, a reference station is provided with a high precision oscillator which is connected to a clock input of a counter. If this counter has a defined counting state, a start signal is generated and transmitted to said substation. At another defined counting state a stop signal is generated and transmitted to said substation. In the substation the oscillator to be adjusted is connected to a local counter, which counts the pulses of the oscillator between said start and stop signals. The count of this counter then is used as a measure for the frequency deviation of the oscillator and can be used for generating a control signal to adjust the frequency of the oscillator of the substation.

12 Claims, 2 Drawing Sheets

METHOD AND CIRCUIT FOR RETUNING THE FREQUENCY OF A FREQUENCY SOURCE

BACKGROUND OF THE INVENTION

The invention refers to a method for adjusting the frequency of a frequency source located at a substation to a reference frequency source located at a reference station. It furthermore refers to circuits for carrying out this retuning method in a network comprising at least a reference station and a substation.

DESCRIPTION OF THE PRIOR ART

In transmission networks for proper reception of the transmitted information, the internal frequency of the transmitting and receiving stations should be identical within a certain tolerance, so that the stations operate in synchronism. However, the frequencies of the local oscillators at the stations are subjected to drift caused by aging of the circuit elements and by external influences as e.g. temperature. After a certain time a frequency difference between the stations may occur, which exceeds the tolerance of the network. If said drift can be controlled, which is the case for temperature drift by controlling the oscillator according to a known temperature-frequency-characteristic of it, it will be corrected locally at each station. However, there remains a certain portion of the drift, which especially for cheap oscillators cannot be compensated. Such drift e.g. is caused by aging effects. To avoid such drift it was necessary to use high precision Quartz oscillators at all stations or to separately transmit a standard frequency signal, which by all stations was used to adjust their frequency.

SUMMARY OF THE INVENTION

Hence, it is a general object of the present invention to provide a method and a circuit for adjusting the frequencies of frequency sources at the stations of a network without need for using highly stable Quartz oszillators at each station and without transmitting a separate standard frequency signal.

It is a further object of the invention to provide a method for retuning the frequency of frequency sources at substations to the frequency source of a reference station in a radio transmission network, wherein the frequency sources of the substations and of the reference stations each are connected to a local counter to provide this counter with clock pulses, and wherein the counters of the reference station and of a substation to be retuned are counting the clock pulses generated by the respective frequency source during the same period, whereas any difference in the result of the counts of the counter at the substation and the counter at the reference station is determined for a respective correction of the frequency of the frequency source of the substation.

It is again another object of the invention to provide a circuit for retuning the frequency of frequency sources at substations to a frequency source of a reference station, said reference station comprising a radio transmitter, a high precision frequency oscillator, a counter and a control circuit, said control circuit being connected to said counter to define a time interval between defined counts and to generate start and stop signals at the beginning and the end of said interval, said signals being transmitted by said radio transmitter, and said substations each comprise a radio receiver, a local frequency oscillator, a local counter and a local control circuit, wherein said local control circuit is connected to said receiver to receive said start and stop signals and further is connected to said local counter and said local oscillator to determine the deviation of the count of the local counter from the count of the counter of the reference station during said interval and to derive therefrom a frequency correction signal for said local frequency oscillator.

It is still a further object of the invention to provide a procedure for retuning the frequency of frequency sources at substations of a network, which procedure is repeated only after relatively long periods of half an hour or an hour, which periods of time can even be made longer depending on the determined deviations, whereas the time for the retuning procedure itself is only about 100 ms, so that the transmission path is substantially not loaded by said retuning procedure.

It is another object of the invention to provide a procedure for retuning the frequency of frequency sources at substations of a network to the frequency of a frequency source of a reference station, whereas all substations are retuned simultaneously after a period of time, and whereas the local oscillators used in said substations can be of lower quality, so that their frequencies remain within a given tolerance at least during said period of time between two following retuning procedures.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
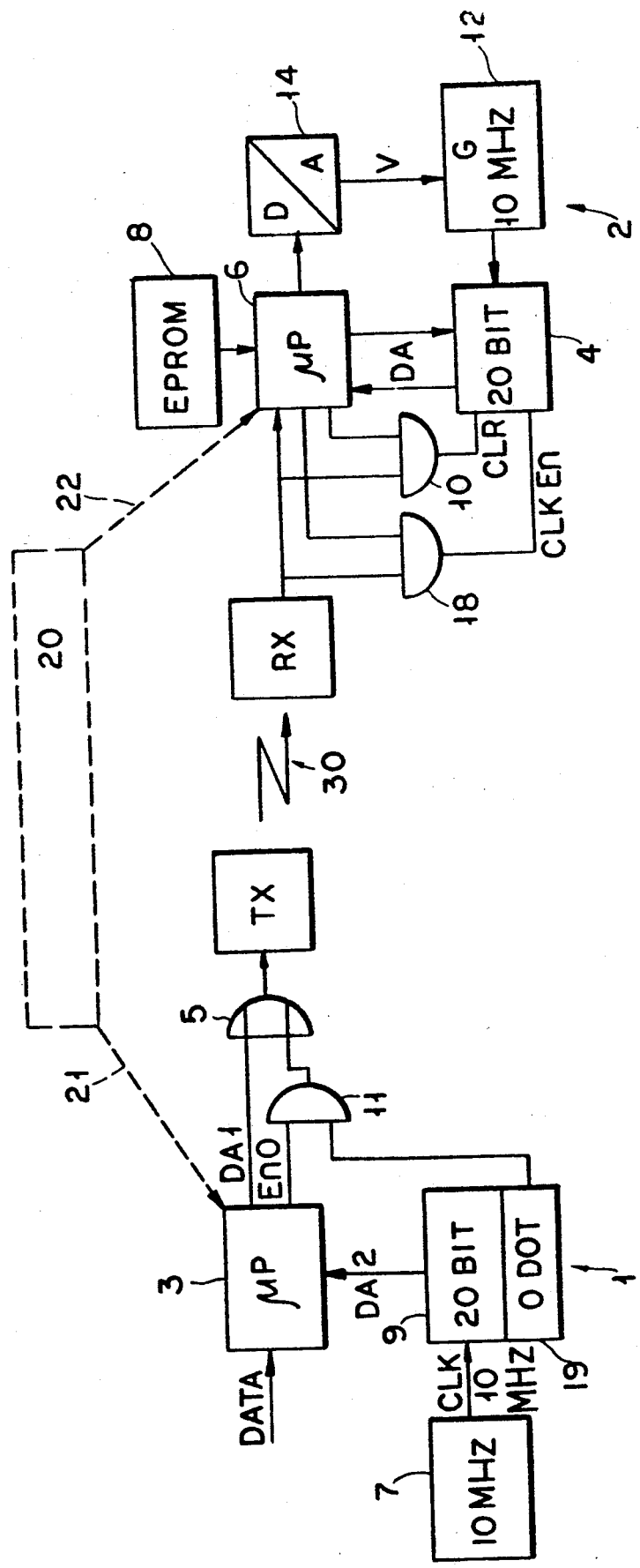
FIG. 1 is a block diagram of a first embodiment of the invention.

In FIG. 1 two stations 1, 2 of a radio transmission network are exhibited. It has to be pointed out that all parts and components, which do not refer to the invention are not shown in this figure. The stations 1, 2 may be part of a radio transmission network as disclosed in the published European Patent Application No. 198 448 of the applicant, which is incorporated by reference. The stations 1, 2 of such a radio transmission network are transmitting stations for paging calls for portable paging receivers. They are connected via lines 21, 22 to a common network control unit 20. A network of this kind may comprise a plurality of such transmitting stations. Between such stations radio signals are exchanged for several reasons as e.g. for synchronization purposes and for exchanging other messages. The invention, however, may also be used in general radio transmission networks for adjusting the carrier frequency of the stations.

It is important for proper communication at high transmission speed that a local frequency source at each station of such network generates frequency signals, the frequencies of which are within a defined tolerance identical throughout the whole network.

Returning now to FIG. 1, station 1 in this figure is a frequency reference station of the network, whereas station 2 is one of several substations. Please note that the network may comprise a plurality of such substations 2 which all have radio connection to the reference station 1.

Reference station 1 comprises a transmitter TX and each substation 2 comprises a receiver RX. Between the transmitters TX of the reference station 1 and the receivers RX of the substations 2 a radio transmission channel 30 is established.

In the reference station 1 the data signals to be transmitted pass a microprocessor 3 and are transferred via a data line DA 1 and a gate 5 to the transmitter TX. They are then transmitted through the transmission channel 30 to the receiver RX of one of the substations 2 and are further processed by a microprocessor 6 of the substation 2.

Reference station 1 further comprises a 10 MHz-reference frequency oscillator 7, which is a high precision Quartz oscillator or a cesium frequency standard. The reference frequency oscillator 7 is connected to the clock input of a counter 9. In the embodiment disclosed in FIG. 1 counter 9 is a 20 bit dual counter. It therefore has 1,048,576 different states. The lowest state is zero. In this state all 20 bits are zero. When the counter has passed through all its 1,048,576 states, it returns to this zero state and begins to count again.

The counter 9 is provided with a zero detection circuit 19. The zero detection circuit 19 generates a zero state signal each time the counter 9 has reached its zero state. The zero detection circuit 19 is connected via an AND-gate 11 and an OR-gate 5 to the transmitter TX. The zero state signal under certain conditions passes the gates 11 and 5 to the transmitter and is transmitted through channel 30.

The substation 2 also comprises a counter 1, which corresponding to the counter of the reference station 1 may be a 20 bit dual counter. It has a start input CLK En and a reset input CLR, which are connected via AND-gates 10, 18 to the receiver RX and to a microprocessor 6. The microprocessor is connected to an EPROM-storage 8, which contains a correction characteristic for retuning a local oscillator 12. The local oscillator 12 is connected to the clock input CLK of counter 4. The local oscillator is also a 10 MHz-frequency oscillator, which however needs not to be very precise. Therefore, a relatively cheap Quartz-oscillator can be used, the frequency of which can be influenced by the operating voltage V supplied by a D/A-converter 14, which is connected to the microprocessor 6.

Before describing the retuning operation in detail it has to be pointed out that the counters 9 and 12 of the reference station 1 and the substation 2, respectively, continuously are counting between two retuning operations. Each such operation therefore is based on the counts of the whole period of time since the last retuning operation.

The retuning process now is carried out as follows: Both, the reference station 1 and the (one or several) substations 2 receive a retuning order message from the network control unit 20 via the respective lines 21, 22. At the reference station 1 the data line is interrupted and the microprocessor 3 unlocks the EnO-input of gate 11. When the 20-bit counter 9 reaches its zero state, the zero detection circuit 19 generates a zero state signal, which is passed via gate 11 to the transmitter TX and transmitted as a stop pulse via channel 30. Counter 9 continues the counting operation so that after it has assumed all its 1,048,576 states, it returns to zero and the zero detection circuit 19 again generates a zero state signal which is transmitted through channel 30 as a reset or start pulse. The interval between two successive zero state signals, i.e. of the stop pulse and the following reset or start pulse is 104.86 ms at an oscillator frequency of 10 MHz. Therewith the retuning operation is finished at the reference station 1. As already mentioned, its counter 4 continues to count for the next retuning operation.

In substation 2 microprocessor 6 unlocks gate 18 connected to the CLK En input of the 20 bit counter 4 upon receiving the retuning order message from the network control unit so that when said stop pulse from the reference station 1 arrives at the receiver RX, the counter 4 is stopped. The actual state of the stopped counter 4 then is detected by the microprocessor 6 and stored therein. Thereafter gate 18 is locked again and instead gate 10 connected to the reset input CLR is unlocked. Upon receipt of said reset or start pulse the counter 4 therefore is reset to zero and starts again to count until after a certain period the next retuning operation is initiated.

If the local frequency oscillator 12 in station 2 has a frequency which is exactly identical to the reference frequency of oscillator 7, its counter 4 has passed exactly the same number of counting cycles as the counter 9 in station 1 within the period since the last retuning operation and therefore exactly reaches its zero state when the stop signal from station 1 appears.

This is the case because counter 9 in station 1 and counter 4 in station 2 both were started at their zero states when transmitting and receiving, respectively, said reset or start pulse at the end of the previous retuning operation. If the two counters 9 and 4 were driven by exactly the same frequency, they both arrive again at a zero state when transmitting and receiving, respectively, said stop pulse at the beginning of a next retuning operation.

Therefore, if at counter 4 of station 2 a zero state is detected upon receipt of the stop signal from station 1, there is exact correspondence of the frequencies at the two stations and the frequency oscillator 12 of substation 2 needs not to be retuned.

If, on the other hand, the frequency of frequency oscillator 12 at substation 2 deviates from the reference frequency generated in station 1, its counter 4 does not show a zero state upon receipt of said stop signal of station 1. The deviation of state of the counter 4 from the zero state then is a direct measure for the frequency deviation. If the frequency of the oscillator 12 is too low, the counter 4 did not pass its last counting cycle completely when receiving the stop signal from station 1. In this case counter 4 therefore assumes a relatively high state below its maxiumum. If the frequency of the oscillator 12 is too high, counter 4 has already begun with a new counting cycle when receiving the stop signal from station 1. In this case counter 4 therefore assumes a relatively low state near zero. Therefore, the direction of the frequency deviation of the oscillator at substation 2 can easily be determined.

In this way a correction signal can be derived from the detected state of counter 4 as the difference to the zero state at the time when it is stopped by said stop signal from station 1. The correction signal is processed by microprocessor 6 to generate a control signal for the frequency oscillator 12. To this end the correction signal is added to the correction characteristic stored in the storage 8. The resulting digital control signal is changed into an analog control signal by means of the D/A-converter 14 and delivered as a corrected operating voltage V to the frequency oscillator 12. The frequency generated by the frequency oscillator 12 thereby is retuned according to the deviation detected for the period since the last retuning operation.

It is not necessary that the retuning operation is initiated by a retuning order message from the network control unit 20, as described in the aforementioned embodiment of the invention. The order for the retuning operation may also be given by the reference station 1 and transmitted to the substation by means of a special message through channel 30. Upon receiving this message in each substation 2 the input CLK En of counter 4 will be unlocked before said stop signal from station 1 is transmitted.

Another possibility for initiating the retuning operation is based on synchronous clocks in the reference station 1 and the substations 2 combined with predetermined retuning times. On the substations 2 microprocessor 6 then unlocks the input CLK En of counter 4 at said predetermined time, at which the stop signal from station 1 is expected (e.g. within a defined time window of 100 ms). Then the retuning operation proceeds as described above.

Figure 2:
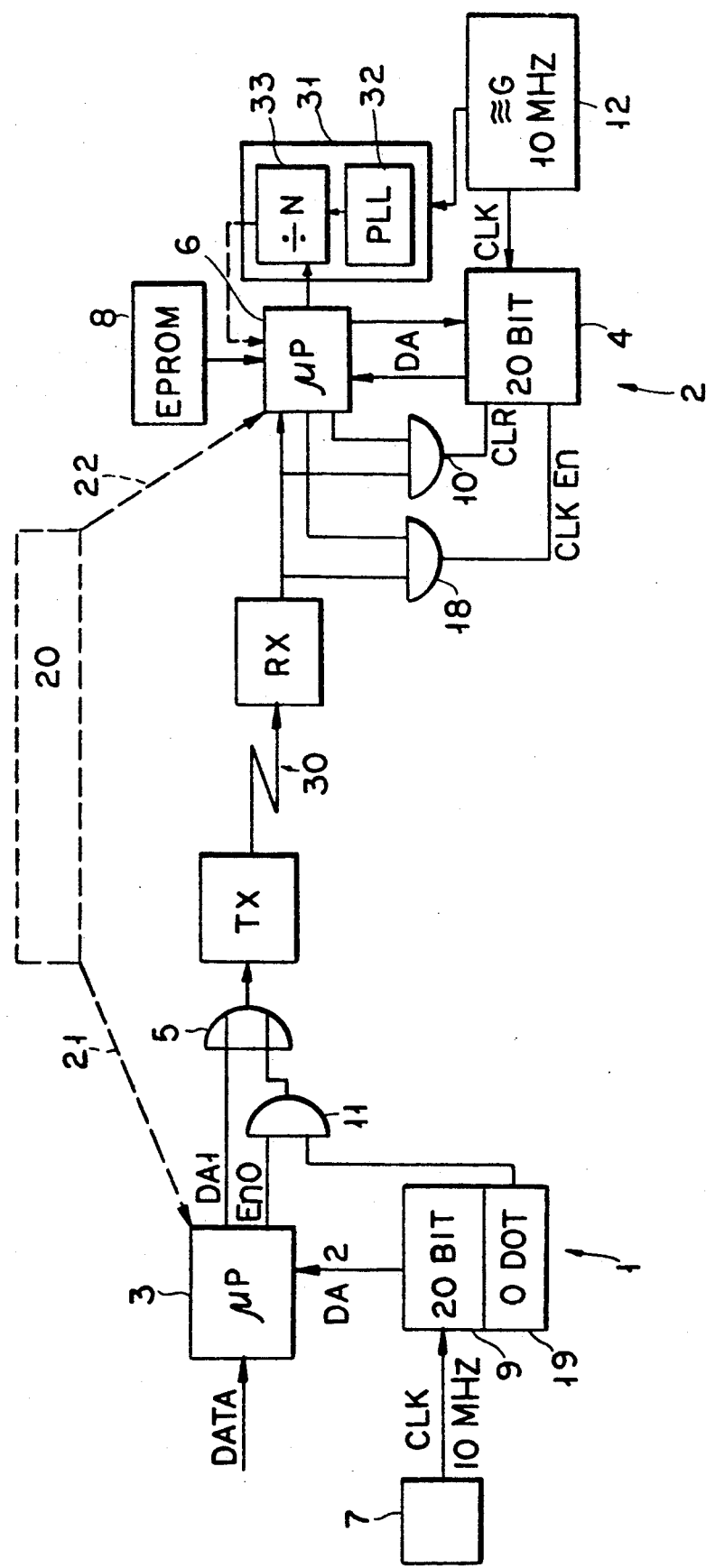
FIG. 2 is a block diagram of a second embodiment of the invention.

In FIG. 2 a variation of the circuit of FIG. 1 is shown, which differs from the above described embodiment of the invention by using a digital retuning of the frequency oscillator 12 instead of an analog retuning. The remaining elements of the circuits are identical in both figures and therefore have the same reference numerals. They will not be described again here.

In the embodiment of FIG. 2 the digital correction is made by means of a clock generator 31, which is provided for deriving a bit rate (of e.g. 512 bit/sec) and the intervals between the digital signal for the data transmission through channel 30 from the frequency oscillator 12. Such clock generator 31 may also be comprised in the embodiment of FIG. 1, but it is not used there for retuning. In the present embodiment the clock generator 31 is used for retuning the frequency. It therefore comprises a PPL-circuit 32 and a divider circuit 33, the division factor N of which is adjustable in accordance with the deviation of the counter 4 from the zero state upon receiving the stop signal from station 1. In this embodiment it is not the frequency of the frequency oscillator 12 which is adjusted but the division factor N of the divider circuit 33.

In both embodiments of the invention the start or reset signal and the stop signal which are generated by reference station 1 and transmitted to the substation(s) 2 define a counting period which is equal for both stations and during which the oscillator pulses are counted in each station. This period preferably is chosen to correspond to an integer number of counting cycles of the counter 9 of reference station 1. For the rest the length of the period can be adapted to the quality of the oscillators 4 used in the substations 2. The length of this period can e.g. be within half an hour and an hour.

The short interval needed for the retuning procedure itself, which in the described embodiments is 104.9 ms, has the advantage that any influence of long term variations of the transmission speed in the transmission channel 30 can be eliminated, since within said about 100 ms between the stop and the start signals the transmission speed remains substantially unchanged.

The disclosed method not only allows to use relatively cheap frequency oscillators for the plurality of substations 2 in the network, but also allows to increase the bit rate of the transmission in the network since the frequency oscillators define the precision of the intervals between the digital signals to be transmitted, which in turn defines the maximum bit rate of the transmission.

While there are shown and described present preferred embodiments of the invention, it is to be distinctly understood that the invention is not limited thereto, but may be otherwise variously embodied and practiced within the scope of the following claims.

We claim:

1. A method for retuning the frequency of pulses of at least one oscillator at a substation to a reference frequency of pulses of a reference frequency oscillator at a reference station in a radio transmission network, in which the oscillator of the substation is coupled to a substation local counter and the oscillator of the reference station is coupled to a reference station counter, the method comprising the steps of:

counting the pulses of the reference frequency oscillator in the reference station counter;

generating a start signal at the reference station when said reference station counter arrives at a predetermined first counting state known to both the reference station and the substation;

transmitting said start signal from the reference station to said substation immediately upon its generation;

receiving said start signal at said substation and starting said substation local counter at this moment;

generating a stop signal at said reference station when said reference station counter arrives at a predetermined second counting state known to both the reference and the substation;

transmitting a stop signal from the reference station to the substation;

receiving said stop signal at said substation and stopping said substation local counter immediately upon receipt thereof;

determining the total count of said substation local counter between said start and said stop signal and comparing this count with the total count of the reference station counter between said predetermined known first and second counting states;

deriving a frequency correction value from said comparison for the frequency source oscillator at said substation;

retuning the frequency of the frequency oscillator at said substation according to said correction value.

2. A method of claim 1, wherein said first and second predetermined counting states of said reference station local counter are the same, the counter having passed an integer number of full counting cycles therebetween.

3. A method of claim 2, wherein said first and second counting states are zero states of said reference station counter.

4. A method of claim 3, wherein upon receipt of said stop signal in said substation, the counting state of said substation local counter is determined, and wherein upon receipt of said start signal in said substation, said substation local counter is reset to its zero state and a new count is initiated.

5. A method of claim 1, wherein said stop signal is generated at a predetermined counting state of said reference station counter and said start signal is generated at the same counting state of said reference station counter after one full counting cycle thereof.

6. A system for retuning the frequency generated at a substation of a radio transmission network to a reference frequency generated at a reference station of said network comprising:

a reference station comprising a radio transmitter, a high precision frequency oscillator operating at a reference frequency, a counter and a control circuit comprising means for detecting a first and a second counting state, said counter of said reference station having a clock input connected to said high precision frequency oscillator, said means for detecting being connected to said counter in order to determine said first and said second counting state of said counter and to generate a start signal at the first counting state and a stop signal at the second counting state, and said control circuit being connected to said radio transmitter for transmitting said start and stop signals by said radio transmitter;

and a substation comprising a radio receiver, a local frequency oscillator, operating at a local frequency, a local counter and a local control circuit, said local counter having a clock input connected to said local frequency oscillator, said local control circuit being connected to said radio receiver and to said local counter in order to start and stop its counting operation upon receiving said start and stop signals from said radio receiver, said local control circuit determining a first and second counting state of said local counter and said local control circuit being connected to said local frequency oscillator to retune said local frequency in accordance with said first and second counting state of said local counter.

7. The system of claim 6, wherein said counter at the reference station and said local counter at said substation are dual counters with the same bit number.

8. The system of claim 6, wherein said control circuit of the reference station comprises a zero state detector connected to the counter of the reference station and generating a signal when the counter assumes the state zero; wherein said signal is transmitted as a stop signal or as a start signal, respectively, by said radio transmitter.

9. The system of claim 8, wherein said zero state detector is provided to generate a stop signal at a first zero state of said counter and a start signal at the following zero state of said counter of the reference station after one full counting cycle thereof.

10. The system of claim 6, wherein said local control circuit of said substation comprises a processor circuit, said processor circuit deriving a digital frequency control signal from said first and second counting state of the local counter for retuning said local frequency.

11. The system of claim 10, wherein said local control circuit of said substation further comprises a D/A-converter connected between said processor and said local frequency oscillator to convert said frequency control signal into an analog control signal for said local frequency oscillator.

12. The system of claim 10, wherein said local control circuit further comprises a clock generator having a divider circuit with a digitally controllable division factor, said divider circuit being connected to said local frequency oscillator and being supplied with said digital frequency control signal from the processor circuit to adjust said division factor in accordance with said result of counting of said local counter, the frequency of said frequency oscillator being divided by said controllable division factor to provide a retuned frequency at said substation.

* * * * *